United States Patent [19]

O'Connor

[11] 3,990,868

[45] Nov. 9, 1976

[54] METHOD OF MAKING CUTTING MASTER FOR EROSION MACHINING

[76] Inventor: Thomas J. O'Connor, 100 Morgan Road, Ann Arbor, Mich. 48106

[22] Filed: Sept. 12, 1975

[21] Appl. No.: 612,885

Related U.S. Application Data

[60] Division of Ser. No. 397,335, Sept. 14, 1973, Pat. No. 3,948,620, which is a continuation-in-part of Ser. Nos. 68,711, Sept. 1, 1970, and Ser. No. 253,906, May 16, 1972, each is a division of Ser. No. 545,652, April 27, 1966, Pat. No. 3,663,786.

[52] U.S. Cl. .................................. 51/298; 51/157; 51/309 R
[51] Int. Cl.² .......................................... C08G 51/12
[58] Field of Search .................................. 51/57–59, 51/157, 204, 206, 293, 298; 219/69

[56] References Cited
UNITED STATES PATENTS

| | | | |
|---|---|---|---|
| 2,545,676 | 3/1951 | Small | 51/204 X |
| 2,774,193 | 12/1956 | Thatcher | 51/59 SS |
| 3,135,852 | 6/1964 | Bentley | 219/69 |
| 3,288,580 | 11/1966 | Curn | 51/204 R |
| 3,433,919 | 3/1969 | Braudeau | 219/69 |
| 3,564,190 | 2/1971 | Kandajan | 219/69 |
| 3,590,472 | 7/1971 | Nix | 51/206 R |
| 3,747,281 | 7/1973 | Fedjukin | 51/204 |
| R27,588 | 2/1973 | Hausermann | 51/157 |

FOREIGN PATENTS OR APPLICATIONS

| | | | |
|---|---|---|---|
| 1,379,623 | 10/1964 | France | 51/157 |

*Primary Examiner*—Harold D. Whitehead
*Attorney, Agent, or Firm*—Whittemore, Hulbert & Belknap

[57] ABSTRACT

A cutting master for total form abrasion machining a predetermined shape in a friable material including a body having a surface which is substantially the mirror image of a shape to be machined by abrasion, which surface is abrasive, is different in size from the shape to be abrasion machined by a predetermined amount, and includes a flat portion having a dimension related to the difference in size between the predetermined shape and the abrasive surface.

3 Claims, 30 Drawing Figures

METHOD OF MAKING CUTTING MASTER FOR EROSION MACHINING

CROSS-REFERENCE TO RELATED APPLICATIONS

This is a division, of application Ser. No. 397,335, filed Sept. 14, 1973, now U.S. Pat. No. 3,948,620 which is a continuation-in-part of application Ser. No. 68,711, filed Sept. 1, 1970, and application Ser. No. 253,906, filed May 16, 1972, which applications were divisional applications of parent application Ser. No. 545,652, filed Apr. 27, 1966, now U.S. Pat. No. 3,663,786.

BACKGROUND OF THE INVENTION

1. Field of the Invention

The invention relates to abrasion machining of friable material such as carbon of the type used to make electro erosion machining electrodes of the like and refers more specifically to cutting masters for abrasion machining electrodes for electro erosion machining from carbon or the like which cutting masters have an abrasive mirror image surface of the electrode to be machined that differs in size from the electrode to be machined by a predetermined amount and the method of making such cutting masters.

2. Description of the Prior Art

Other than the disclosure of the above referenced related patent applications and the references cited therein, there is no know prior art in the field of precision total form abrasion machining. Abrasion machining has been accomplished in the past by relatively uncontrolled grinding, chipping, etching, engraving, and the like, which does not produce total form machining and is for the most part substantially non-precision. Thus, sculpturing with a chisel may be considered abrasion machining but has a precision controllable only by the artist in his manual handling of tools. Even with accomplished artists, sculpturing is not total form machining, but is single point or line machining at best. Similarly, mechanical etching and engraving has been controlled only by the skill of the hands of the etcher and is single point machining in nature. Grinding, while it may be precision, is certainly not total form machining of the type considered in the present application and in the above referenced applications, and at best is only single line and not total form machining. Thus, in grinding there is a single line of contact between the workpiece and the grinding wheel rather than a point contact as with an etching or engraving needle or chisel, or substantially total contact between an abrasive surface of a cutting master and a workpiece as in total form abrasion machining.

SUMMARY OF THE INVENTION

The invention is directed to the method of making a cutting master for total form abrasion machining.

Cutting masters for total form abrasion machining have a surface which is a mirror image of a form to be abrasion machined, which mirror image surface differs in dimension from the form to be machined in two of three mutually perpendicular directions. The mirror image surface of the cutting master is abrasive and includes a flat portion which is equal in size to the difference in size between the cutting master and the form to be machined in the two mutually perpendicular directions.

The cutting masters may be formed in a plurality of ways. Thus, for example, a model of the form to be machined which is different in size from the form to be machined by a predetermined amount may first be produced by conventional machining such as single point or line machining or by electro erosion methods, and a mirror image master cutter may be cast over the model of a settable material having an abrasive mixed therein. The settable material may be set by chemical curing or change of temperature or the like after the settable material is cast on the model.

The cutting master may be formed by a plurality of small diameter rods having ends positioned on the machined different size model, which rods are then locked in position by a binder or poured thereover or placed thereon. With such method, the ends of the rods may be pointed as desired and the ends of the rods may be exposed by sandblasting or an electrical discharge machining process.

The cutting master may also be formed by spraying metal such as aluminum on a model of the shape to be total form abrasion machined to form a mirror image model of relatively soft metal, spraying electrode material such as copper on the soft metal mirror image model formed to produce an electrode which is the exact form to be abrasion machined, using the electrode so formed to sink a mirror image form of the shape produced by an electro erosion process in conjunction with a rotary orbital movement applied to the electrode whereby the electrode is moved in two planes perpendicular to the direction of movement of the electrode toward a workpiece during the electro erosion process, casting a cutting master form in the electro erosion machined form which also differs from the shape to be abrasion machined by a predetermined amount, and casting a settable material having abrasive material therein over the cast cutting master form.

Alternatively, the cutting master may be formed by an electro erosion machining process directly either by first manufacturing an electrode which differs in size from the shape it is desired to abrasion machine by a predetermined amount and producing the cutting master by a direct plunge in electrical discharge machining. Alternatively, an exact size model of the shape to be produced may be produced and used as an electrode in a straight plunge electrode discharge process, after which the electrode is orbited in all directions in a plane perpendicular to the direction of plunge, to produce the different sized cutting master which has an abrasive surface due to the normal characteristics of electrical discharge machining.

In such processes, if it is desired to use the form to be machined as an electrode to produce a cutting master, and if it is not constructed of a conductive material, a conductive material may be sprayed over the non-conductive form to be machined. Either male or female master cutters may be produced by the above methods. Wherein the master cutter is female, it will be oversize, while a male master cutter will be undersize, whereby the rotary, orbital motion provided in abrasion machining as set forth in the above referenced patent applications will produce a machined form which is of the desired dimension.

DESCRIPTION OF THE PREFERRED EMBODIMENTS

Figure 1:
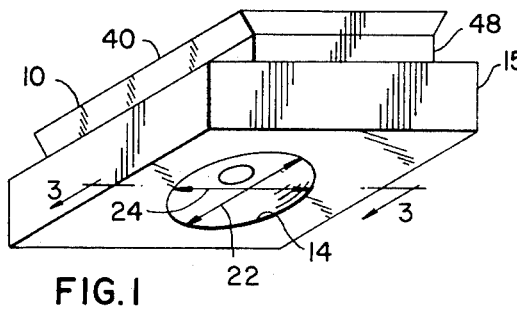
FIG. 1 is a perspective view of a female cutting master according to the invention constructed by the method of the invention.
Figure 2:
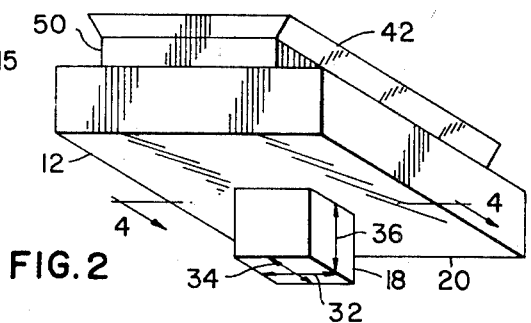
FIG. 2 is a perspective view of a male cutting master according to the invention constructed by the method of the invention.

As shown best in FIGS. 1 through 4, the invention relates to cutting masters for abrasion machining constructed in accordance with the invention, which cutting masters may be either female cutting masters 10 or male cutting masters 12. In the case of the female cutting master 10, a recess 14 having a mirror image of a male form to be abrasion machined is provided in the cutting master body portion 16. In the case of the male cutting master 12, a projection 18 having the mirror form of a female electrode to be abrasion machined is provided on the body portion 20 of the cutting master.

Figure 3:
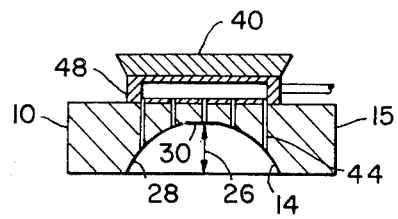
FIG. 3 is a cross section of the cutting master illustrated in FIG. 1, taken substantially on the line 3—3 of FIG. 1.

The recess 14 in the cutting master 10 is oversize in its dimensions extending in the planes parallel to the opening created thereby in the surface 21 which is defined by the mutually perpendicular arrows 22 and 24 in FIG. 1, and is the same size as a male electrode to be machined thereby in the direction of arrow 26 illustrated in FIG. 3. The surface 28 of the recess 14 is abrasive with respect to friable material such as carbon used for electro erosion electrodes and the like.

In addition, the cutting master 10 is provided with a centrally located flat portion 30 on the surface 28. The flat portion 30 is circular due to the hemispherical form to be machined by the cutting master 10 and the rotary, orbital movement provided the cutting master 10 in operation when secured to a total form abrading machine, as disclosed in the above referenced United States patent and patent applications.

The projection 16 on the cutting master 12 is constructed undersize in the dimensions indicated by the arrows 32 and 34 with respect to a recess in a carbon block or the like which is to be abrasion machined. In the dimension indicated by the arrows 36, the projection 18 is the same size as the recess to be machined. Again, the surfaces of the projection 18 are abrasive and include a flat portion 38 required due to the rotary, orbital movement in the plane of the surface 38 provided the cutting master 12 on a total form abrading machine.

Figure 4:
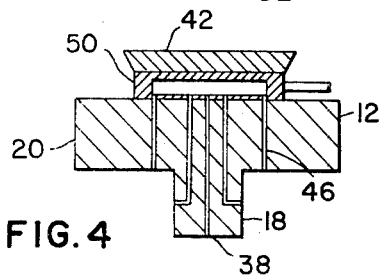
FIG. 4 is a cross section of the cutting master illustrated in FIG. 2, taken substantially on the line 4—4 of FIG. 2.

As shown in FIGS. 3 and 4, the cutting masters 10 and 12 have dovetail members 40 and 42 secured thereto by convenient means such as bolts or the like in the manner set forth in U.S. Pat. No. 3,497,930 so that the cutting masters 10 and 12 may be readily secured to an electrical discharge machine ram or a platen on a total form abrading machine with equal facility and in an exact position.

In operation, a cutting master 10 or 12 may be positioned on a total form abrading machine as shown in the first above referenced patent and provided with a rotary, orbital motion in the direction of arrows 22 and 24 or in the direction of arrows 32 and 34 while being moved toward a workpiece which may be a carbon block to provide abrasion machining of the carbon block. The movement toward the workpiece in the direction of arrows 26 and 36 is under pressure of for example 35,000 pounds which may provide for example a pressure of 350 pounds per square inch on the surface being abraded.

During the abrasion machining process, the cutting master 10 or 12 is pulsed; that is, is periodically withdrawn from contact with the workpiece being formed in the direction of the arrows 26 and 36 to improve the flushing between the cutting master and workpiece. Flushing is provided through openings 44 and 46 in the cutting masters 10 and 12 and through diaphragms 48 and 50 as in electrical discharge machine flushing.

The flushing material may be a light oil such as kerosene or may be water, or any other fluid which will wash away the abraded particles and not provide an objectionable reaction with the cutting master or workpiece being cut. In fact, the flushing may be done with air or other gases and could be accomplished by drawing a vacuum between the cutting master and workpiece.

The cutting masters 10 and 12 may be made in a number of ways of a plurality of materials.

Figure 5:
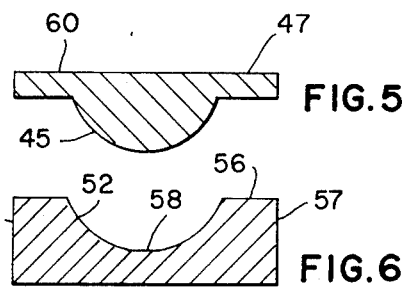
FIG. 5 is a cross section of a male model electrode having the same dimensions as a form to be total form abrasion machined.

As shown in FIGS. 5 through 8, a model 60 which is essentially a hemisphere 45 on a flat body 47 which is required to be, for example, made of carbon in the exact size shown in FIG. 5 may be secured to an electrical discharge machine as an electrode and used to machine a recess 52 in a block of steel 54 by the electrical discharge machining method. The recess 52 is the same as the recess 28 in that it is oversize in two perpendicular directions in the plane of the surface 56 of the steel block 54 and has a circular flat surface portion 58 therein due to rotary, orbital movement of the model 60 in the electrical discharge machining process either after or during movement of the model 60 into the steel block 54 to produce the recess 52. Such electrical discharge machining will provide the typical alveolar, electrical discharging machining finish on surface 58 of recess 52 which is abrasive.

Figure 7:
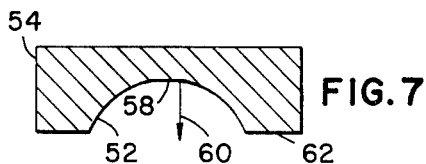
FIG. 7 is a section view of the oversize mirror image cutting master illustrated in FIG. 6 in a position to abrasion machine the carbon electrode of FIG. 8.
Figure 8:
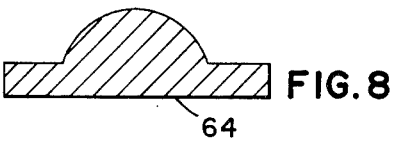
FIG. 8 is a section view of a carbon electrode produced by total form machine abrasion with the oversize cutting master illustrated in FIG. 7.
Figure 9:
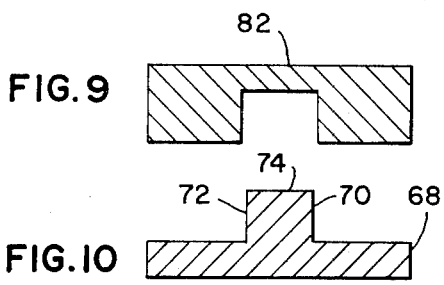
FIGS. 9 through 12 are similar to FIGS. 5 through 8 but show a male cutting master which is undersize in contrast to the oversize female cutting master illustrated in FIGS. 6 and 7.

On turning the steel block 54 having the recess 52 cut therein over, as shown in FIG. 7, and securing it in a total form abrading machine as disclosed above, over a carbon block workpiece and moving the cutting master 57 thus formed toward the carbon block in the direction of arrow 60 in FIG. 7 while providing it with rotary, orbital movement in the plane of the surface 62, a carbon electrode 64 which is the same size as the original model 60 will be produced if the rotary, orbital movement given the cutting master 54 is the same as the rotary, orbital movement given the model 52 used as an electrode to produce the cutting master 54. Further, it will be understood that due to the relatively hard steel cutting master and the soft carbon electrodes 64 being produced, the cutting master 54 may be used to produce a substantial number of carbon electrodes 64 before it needs to be re-dressed.

It will be understood that flush holes may be drilled in the cutting master 54 as desired and that manifolds and connecting structures such as the manifolds 48 and 50 and the connecting dovetail portions 40 and 42 of cutting masters 10 and 12 may be provided the cutting master 54 and the other cutting masters disclosed herein, as desired, although they may not be specifically shown in the figures.

Figure 10:
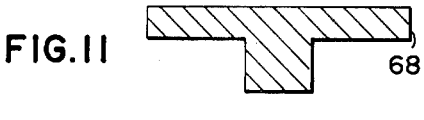
Figure 11:
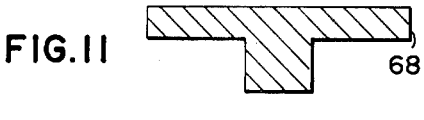

A similar process for producing the male cutting master illustrated in FIGS. 10 and 11 is used. Thus, a female carbon electrode 82 which it is desired to duplicate is first used in an electrical discharge machining process to machine the cutting master 68 having the projection 70 thereon with an electrical discharge machining finish on surface 72 and the flat portion 74.

Figure 12:
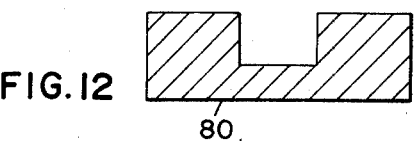

The steel cutting master 68 having the flush holes 76 therein and with an appropriate manifold and means for attaching the cutting master to a total form abrasion machine secured thereto, which are not shown, is used to abrade a carbon block to produce a female carbon electrode 80, as shown in FIG. 12, which is exactly the same as the original carbon electrode 82 providing only that the rotary, orbital movement given the cutting master 68 in abrading the electrode 80 is the same rotary, orbital movement that the original electrode 82 is given in electrical discharge machining the steel cutting master 68.

Should the original model 60 or electrode 82 not be electrically conductive, they may be sprayed with a thin conductive coating prior to their use as electrical discharge machining electrodes to produce the steel cutting masters 54 and 68. Thus, they may for example be spray coated with aluminum or copper.

Further, if it is not desired to make the different sized cutting masters 54 and 68 by imparting rotary, orbital movement to the original model or electrode, an initial model or electrode may be constructed which is oversize or undersize as required by any other method desired such as, for example, casting or metal-to-metal cutting as in milling, or the like, and the cutting masters 54 or 68 formed by straight plunge in an electrical discharge machining operation.

Figure 13:
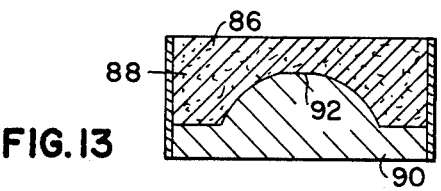
FIG. 13 is a cross section of an oversized model of a form to be total form abrasion machined with a cutting master constructed of a settable plastic having an abrasive material therein cast thereover.
Figure 14:
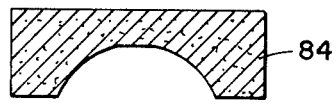
FIG. 14 is a cross section of the cutting master of FIG. 13 ready for total form abrasion machining of a carbon electrode.
Figure 15:
FIG. 15 is a cross section of a carbon electrode abrasion machined by the cutting master of FIG. 14.
Figure 18:
FIG. 18 is a cross section of a carbon electrode abrasion machined by the cutting master of FIG. 9.

As shown in FIGS. 13 through 15, a female cutting master 84 is produced by casting a settable material 86 having an abrasive material 88 dispersed therein over an oversize model of a part to be total form abrasion machined 90. The oversize model 90 may again be produced by any known method such as electrical discharge machining, casting, milling, or the like. It is, of course, desirable that the oversize model 90 be constructed of easily workable material to permit making of the oversize model in the least amount of time with the least effort.

The settable material may be any material which sets to provide a relatively hard cutting master without appreciable shrinkage so as to retain the form of the model 90. For example, the settable material 86 may be an epoxy resin and may have fillers therein such as sand or the like. It also may be metal such as aluminum, or the like.

The epoxy resin may be defined by molecules which are characterized by the presence of epoxy or epoxylene groups. One group of epoxylene resins are glycidol ethers of polyhydric phenols such as the di-glycol ethers of biphenol-a. Another group of epoxy resins suitable for use in the present invention are the group known as epoxylated novolac resins. For further disclosure of these resins, reference is made to U.S. Pat. Nos. 3,394,105 and 3,434,087.

The abrasive material may be a plurality of abrasive materials such as emery, carbide chips, glass, industrial diamond, and the like. Further, the abrasive material need not be provided throughout the settable material but may be applied only adjacent the surface of the recess 92.

Figure 6:
FIG. 6 is a cross section of an oversized mirror image cutting master of the electrode shown in FIG. 5 formed by electro erosion machining.

Again, in operation and cutting master 84, as shown in FIG. 6, is positioned in a total form abrading machine over a carbon block or the like ans provided with a rotary, oscillatory motion to provide a carbon electrode 92, as shown in FIG. 15, which is of a desired shape smaller than the oversize recess 92 by an amount equal to the rotary, orbital motion displacement which the model 90 is produced or could have been produced by rotary, orbital motion.

Figure 17:
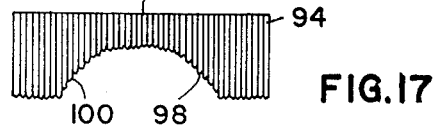
FIG. 17 is a cross section of the cutting master of FIG. 16 ready for total form abrasion machining of a carbon electrode.

The cutting master 94, as shown in FIG. 17, is constructed of a plurality of small diameter, individual cylindrical rods 96 which have sharp ends 98 together forming the abrasive surface 100 which is oversize with respect to a finished electrode 102 to be abraded in carbon in two dimensions and the same size as the electrode 102 in the third dimension as above. The surface 100 again has a flat area 104 produced by the rotary, oscillatory motion given the master cutter 94 in producing the electrode 102. The steel rods 96 are held together rigidly by a filler such as lead, babbitt, expoxy plastic or the like.

Figure 16:
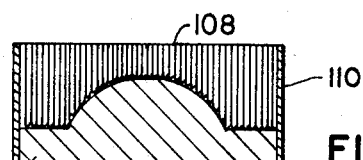
FIG. 16 is a cross section of an oversized model of a form to be total form abrasion machined with a cutting master thereon produced by placing the sharpened ends of a plurality of small diameter, parallel rods on the oversize cutting master and securing the rods together in the position taken by the rods.

In production of the cutting master 94, the rods 96 are positioned over an oversize electrode model 106 with the pointed ends thereof engaged with the model and conforming to the contour thereof, as shown in FIG. 16. The rods 96 are then fixed in position by pouring the filler into the openings provided between the cylindrical rods. When the filler has set; that is, due to curing or cooling, the surface 108 is machined as desired to permit securing of the master cutter 94 to an abrading machine after removal of the master cutter 94 from the box 110 in which it is produced. Again, the oversize electrode model 106 may be produced by any of the above indicated methods.

Figure 19:
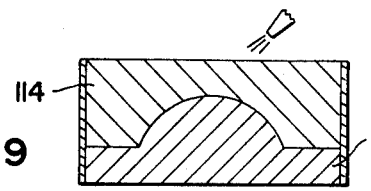
FIG. 19 is a cross section of a model of a form to be total form abrasion machined with a soft metal sprayed mirror image form produced thereon.
Figure 25:
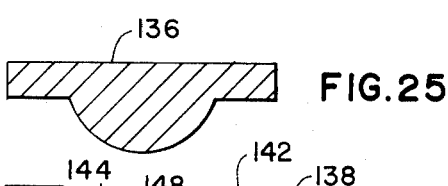
FIG. 25 is a cross section of a form to be total form abrasion machined.
Figure 20:
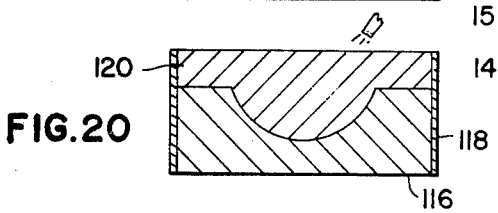
FIG. 20 is a cross section of the shape sprayed mirror form to be machined of FIG. 19 inverted and having an electrode produced thereon by spraying which is of the exact form to be produced by total form abrasion machining.
Figure 26:
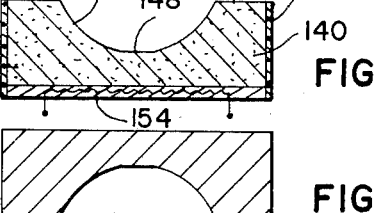
FIG. 26 is a cross section of an oversize cutting master for the form to be machined illustrated in FIG. 25 formed of settable material having abrasive particles therein which is set while the form to be machined is positioned therein and given a rotary, orbital movement.

In FIG. 19, a model electrode of the exact size it is desired to produce by total form abrasion machining is positioned in the box 114 and a mirror image female form 116 is sprayed onto the model 112. The sprayed mirror image model may be, for example, aluminum.

Figure 21:
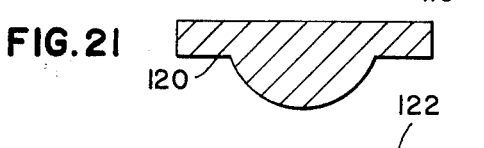
FIG. 21 is a cross section of the electrode of FIG. 19.

The aluminum mirror image model is then reversed and positioned in a box 118 and an electrode model 120 is sprayed on the aluminum model. A parting agent may be used between the aluminum model and the electrode model. The electrode model may be, for example, sprayed copper. The copper electrode model 120 is used in an electrical discharge machining operation with rotary, oscillatory motion, positioned as shown in FIG. 21, to produce an oversize female form 122 in, for example, aluminum or other metal, easily machined by electro erosion methods.

The oversize female model 122 is then positioned in a box 124 and a male oversize model 126 is cast. The male oversize model 126 may be of any suitable material such as white metal or the like. The male oversize model 126 is then positioned in a box 128 and an oversize female cutting master 130 is cast over the oversize male model 126. The cutting master 130 is cast of settable material such as the epoxy plastic indicated above having the abrasive material 132 dispersed therein as before. The oversize male model 126 and the aluminum oversize model 122 may be used a plurality of times to produce a substantially indefinite number of cutting masters 130.

In the method of producing cutting masters illustrated in FIGS. 25 through 28, a model of the electrode part to be produced 136 is advanced toward the box 138 which has a settable material 140 having abrasive material 142 therein while the settable material 140 is setting. At the same time, the electrode model 136 is provided with a rotary, orbital motion as indicated above to produce the female recess 144 in the cutting master 146 on setting of the settable material 140.

Figure 27:
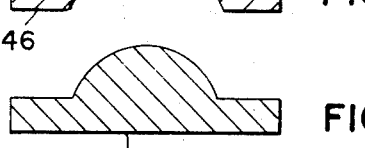
FIG. 27 is a cross section of the oversize cutting master of FIG. 26 in position to total form abrade the carbon electrode of FIG. 28.
Figure 22:
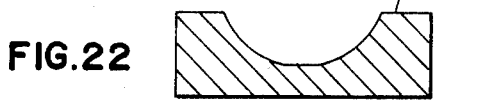
FIG. 22 is a cross section of an oversize mirror image form of the electrode of FIG. 21 formed by plunging the electrode of FIG. 21 into soft metal in an electrical discharge machining process and giving the electrode a rotary, orbital movement.
Figure 28:
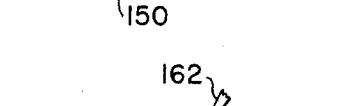
FIG. 28 is a cross section of a total form abrasion machined carbon electrode made with the cutting master of FIG. 27.
Figure 23:
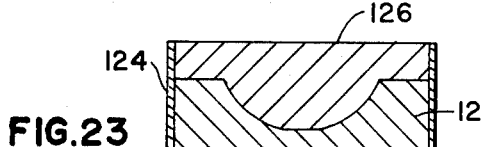
FIG. 23 is a cross section of the electro eroded oversize mirror image form of FIG. 22 with an oversized cast mirror image form produced thereover.

Again, the recess 144 is oversize in two dimensions and has a flat portion 148 so that it is suitable for producing a graphite electrode 150 which is identical to the model 136 by abrading the graphite when the cutting master 146 is removed from the box 138 and secured in an inverted position as shown in FIG. 27 by convenient means to abrading equipment and provided with the same rotary, orbital motion in addition to a motion toward the electrode 150 shown in FIG. 28.

The settable material 140 may be any suitable material as indicated above and the setting of the settable may be aided by either providing cooling of the box 138 as by cooling coil 152 extending therearound or heat applied to the box 146 by heating element 154 or the like depending on the type of settable material used.

Figure 29:
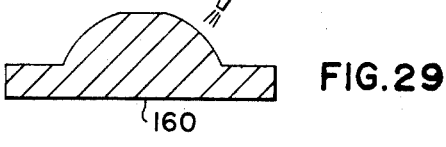
FIG. 29 is a cross section of a cutting master for total form abrasion machining, which cutting master has been machined oversize and to which abrasive has been adhered.
Figure 24:
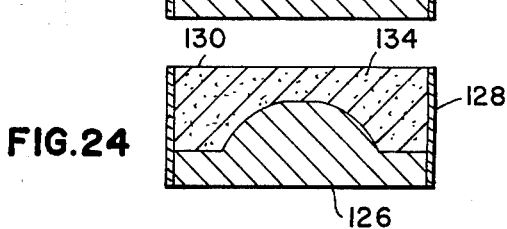
FIG. 24 is a cross section of the cast oversize mirror image form illustrated in FIG. 15 over which a settable material having abrasive particles dispersed therein is cast to form the oversize cutting master.

In addition, as shown in FIG. 29, a suitable cutting master 160 may be constructed by spraying silica 162 or other fine abrasive material such as emery mixed with an adhesive over an oversized model produced by any conventional method. Alternatively, the adhesive may be applied to the oversized model and the abrasive material sprinkled or sprayed on the oversized model after which the adhesive is allowed to set.

Figure 30:
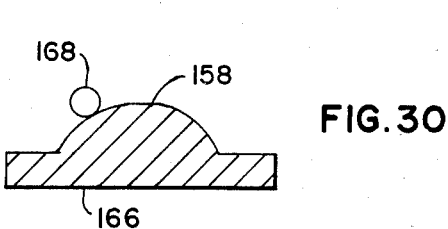
FIG. 30 is a cross section of a cutting master for total form abrasion machining, which cutting master has been machined oversized and the surface of which has been impregnated with abrasive material.

As shown in FIG. 30, the oversize cutting master 164 as disclosed above is produced by rolling or pressing abrasive material such as emery into a relatively soft body 166 which may be constructed of light metal such as babbitt or the like with the roller 168.

While preferred embodiments of the invention and modifications thereof have been discussed in detail, it will be understood that other embodiments and modifications are contemplated. Therefore, it is the intention to include all modifications and embodiments as are defined by the appended claims within the scope of the invention.

What I claim as my invention is:

1. The method of forming a cutting master for total form abrasion machining of a predetermined form in carbon or the like having a predetermined exact size comprising producing a surface on a body of rigid material which is substantially a mirror image of the predetermined form to be machined and different in size from said predetermined exact size by a predetermined exact amount and making the surface abrasive wherein the cutting master is formed by placing a soft, easily deposited metal on a model of a form to be total form abrasion machined to form a mirror image of the form, placing an electrode material over the mirror image so formed to provide an electrode of the form to be abrasion machined, machining an oversize form in a metal which is easily electro-erosion machined with the electrode, casting a mold pattern from the oversize form and casting cutting masters of a settable material having abrasive particles therein over the mold pattern.

2. The method as set forth in claim 1 wherein the soft metal is easily sprayed and the soft metal is sprayed on the model of the total form to be abrasion machined.

3. The method as set forth in claim 1 wherein the electrode material is sprayed over the mirror image so formed to produce an electrode of the form to be abrasion machined.

* * * * *